United States Patent [19]

Tsujimoto et al.

[11] 4,131,528
[45] Dec. 26, 1978

[54] PROCESS FOR THE MASS PRODUCTION OF OZONE

[75] Inventors: Minoru Tsujimoto, Fujiiderashi; Minoru Okada, Ikedashi; Yuji Suzuki, Takatsukishi; Toshihiro Hirai, Nishino Sakaishi, all of Japan

[73] Assignee: Daido Sanso Kabushiki Kaisha, Osaka, Japan

[21] Appl. No.: 754,029

[22] Filed: Dec. 23, 1976

[51] Int. Cl.² .................. B01J 1/10; C01B 13/11
[52] U.S. Cl. ....................... 204/157.1 R; 204/176; 204/DIG. 11
[58] Field of Search ............... 204/157.1 R, 157.1 H, 204/176, DIG. 11

[56] References Cited
U.S. PATENT DOCUMENTS

| 2,704,274 | 3/1955 | Allison | 204/176 |
| 3,752,748 | 8/1973 | McMillan | 204/157.1 R |
| 3,921,002 | 11/1975 | Williams et al. | 204/176 |

OTHER PUBLICATIONS

Proceedings Royal Society, London, vol. A127, (1930), p. 530.

Primary Examiner—Howard S. Williams
Attorney, Agent, or Firm—Eyre, Mann, Lucas & Just

[57] ABSTRACT

The invention provides a process for the mass production of ozone in a liquid form from liquid oxygen, by the utilization of ozonizing radiations or electric discharge occurring in the oxygen gasified by being warmed to a temperature not higher than the boiling point of ozone.

8 Claims, 2 Drawing Figures

PROCESS FOR THE MASS PRODUCTION OF OZONE

The present invention relates to a process for the mass production of ozone in a liquid form from a liquid oxygen efficiently and economically.

The common commercial process is to impress electric discharge on air or oxygen, but under this process the productivity is unprofitably low, thereby leading to the increased production cost. Of these processes, especially when air is utilized, $HO_x$ occurs, which provides a contamination problem. By either process the ozone produced has too short half-life to be used for practical purposes. A further commercial process is to impinge ultraviolet radiation, X-rays or cathode rays on air or oxygen at normal room temperatures. Under this process, however, the concentrations are likewise low, thereby resulting in the increased production cost. For the economical reason the large-scale production of ozone has not been successfully materialized.

The present invention aims at solving such problems in the industry, and has for its object to provide an improved process for producing pure liquid ozone in large quantities from liquid oxygen efficiently and economically.

According to one aspect of the present invention, oxygen at low temperatures is subjected to ozonizing radiations, such as laser beams, electron beams or plasma radiation, thereby obtaining a liquefied ozone from which ozone is separated without any intermediate processes such as distillation.

According to another aspect of the present invention, a liquid oxygen is gasified by being warmed up to an appropriate temperature without exceeding the boiling point of ozone, and under this atmosphere electric discharge takes place, thereby obtaining a liquefied ozone from which ozone is separated without any intermediate processes such as distillation.

The invention will be more particularlly described by way of example, with reference to the drawing, in which.

Figure 1:
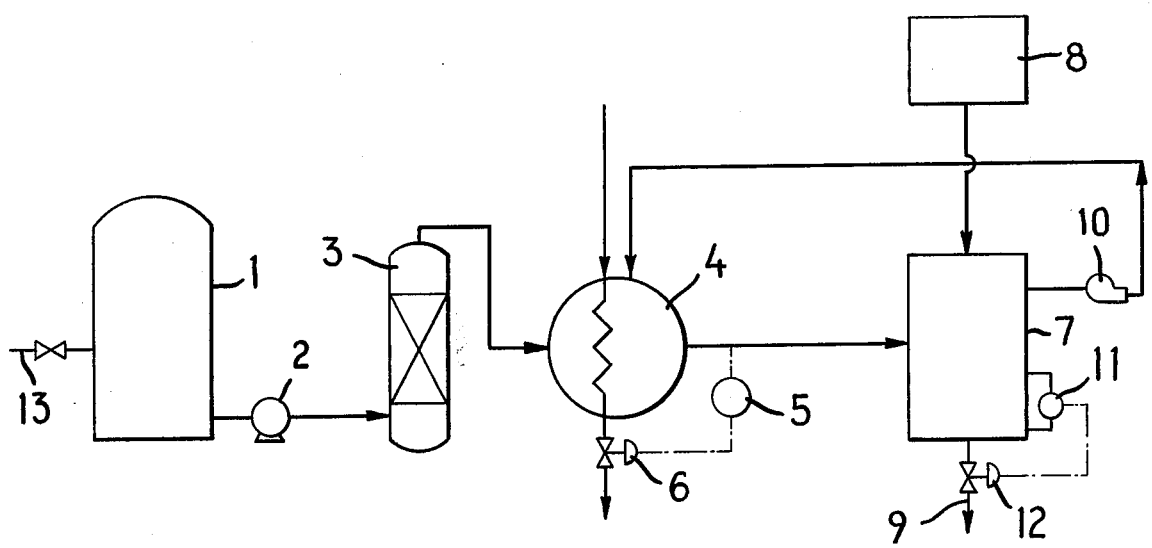
FIG. 1 is a flow diagram of a system for carrying out the process according to the present invention.

Referring to FIG. 1, a liquid oxygen cooled to a low temperature ($-183°$ C. or below at 1 atm.) is pumped out from its container 1 to an adsorption tower 3, wherein reference numeral 2 indicates a pump. The adsorption tower is packed with an adsorbent, such as molecular sieve, silica gel, alumina, so as to take up hydrocarbons by adsorption from the liquid oxygen. Prefereably a plurality of adsorption towers are installed in parallel, such that they can be employed by turns. When the container 1 is internally pressurized the pump 2 will not be necessary, and when hydrocarbons are previously removed from the oxygen, the adsorption tower or towers will not be required. The liquid oxygen in the adsorption tower 3 is supplied to a heat exchanger 4, where heat exchange is carried out between the oxygen and a suitable fluid, such as air, water, so as to enable the liquid oxygen to warm up to a temperature between the boiling point of oxygen ($-183°$ C. at 1 atm.) and the boiling point of ozone ($-112°$ C. at 1 atm.). This process of heat exchange is intended to gasify the oxygen by raising its temperature without exceeding the boiling point of ozone ($-112°$ C. at 1 atm.). In this case, when the gasified oxygen is kept under pressure, it can be warmed to a little higher temperature than $-112°$ C. Normally it is preferred to warm the gaseous oxygen in the range of $-150°$ C. to $-120°$ C. at the atmospheric pressure.

For the heat exchanger 4, various types of exchangers, such as a multipipe exchanger, a double pipe exchanger, a coiling system exchanger, a fan exchanger, can be selectively employed. The temperature at the outlet of the exchanger is controlled by a valve 6 closed or opened in response to the indication of a thermometer 5, which is located adjacent to the outlet of the exchanger 4 while being operatively connected to the valve 6 located in the heating line. Thus a desired temperature is constantly maintained. When the fan exchanger is employed, it will be required that the thermometer is operatively connected to the motor of the fan, such that the r.p.m. of the motor is increased or decreased in response to the temperatures detected by the thermometer, thereby ensuring the desired temperature.

In this way the oxygen gas is warmed to a temperature between the boiling points of oxygen and ozone, and is subsequently fed to a reaction chamber 7, in which the oxygen gas is instantaneously converted into ozone by its exposure to ozonizing radiations. The ozonizing radiations are generated by an apparatus 8 built adjacently to the reaction chamber 7. The ozone produced is immediately liquefied as the temperature in the chamber 7 is below its boiling point, and is led out of the chamber by way of a discharge line 9. The oxygen remaining left from the reaction is fed back to the heat exchanger 4 by a blower 10, and is supplied again to the reaction chamber 7, where it undergoes the same treatment. In the illustrated system the liquefied ozone is taken away from the chamber 7 by the amount predetermined by a level gauge 11 provided in the side of the chamber, the level gauge being operatively connected to a valve 12 so as to enable the same to close or open in response to the liquid level in the chamber. The liquid oxygen is introduced into the container 1 by way of an inlet line 13, whereby the procedure for the production of ozone is considerably simplified, that is, by connecting the inlet line 13 to the container 1 the system is made ready for the automatic and continuous production of liquid ozone. It is preferred that the adsorption tower 3, the liquid oxygen container 1, and others as required, are covered with a heat insulation material.

Figure 2:
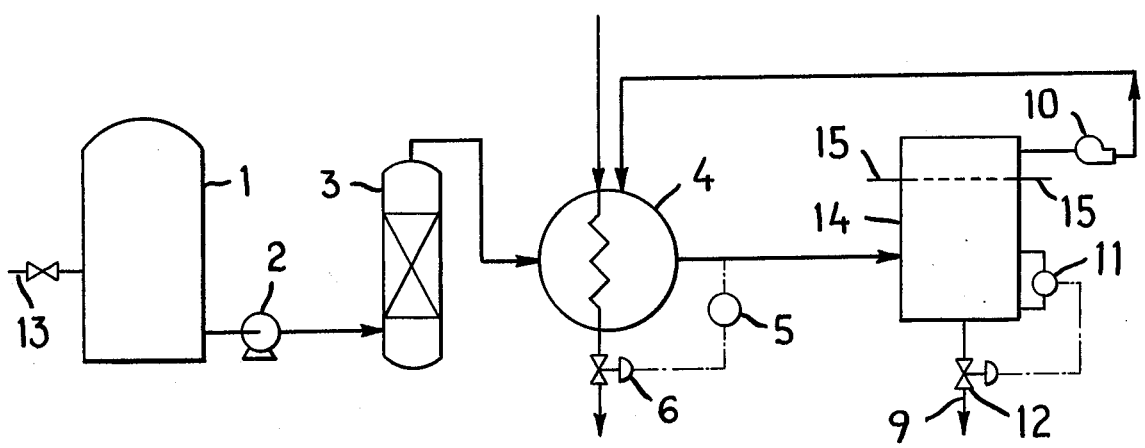
FIG. 2 is a flow diagram of a modified version of the system illustrated in FIG. 2.

Referring to FIG. 2, in which a modified version of the system is shown, a reaction chamber 14 includes electrodes 15 across which a high voltage current is impressed to expose the oxygen to electric discharge. As a result the oxygen gas is partly converted into ozone, but as the temperature in the chamber 14 is below the boiling point of ozone, the produced ozone is instantly liquefied, which flows out of the chamber by way of the discharge line 9. Except for the reaction chamber 14, the system is substantially the same as that shown in FIG. 1, with respect to its structure and operation.

The present invention will be better understood by the following examples:

EXAMPLE (1)

A liquid oxygen was contained at $-181°$ C. in the container 1, and was pumped out to the adsorption tower 3 at the rate of 20ml/min., where it was purged of hydrocarbons. Subsequently it was sent to the double pipe exchanger 4, in which the oxygen was warmed to a temperature of −145° C. under the atmospheric pressure as a result of heat exchange with air. In this way a gasified oxygen was obtained, which was sent to the reaction chamber 7. In the chamber the oxygen was exposed to laser beams. As a result of a liquefied ozone flowed from the chamber at the rate of 6ml/min. It was found that 35.6% by weight of the oxygen gas had been converted into ozone.

EXAMPLE (2)

A liquid oxygen was contained at −181° C. in the container, and was pumped out to the adsorption tower at the rate of 20ml/min., where it was purged of hydrocarbons. It was then fed to the double pipe exchanger, in which the oxygen was warmed to a temperature of −150° C. under the atmospheric pressure as a result of heat exchange with air. In this way the oxygen was gasified, which was sent to the reaction chamber. In the chamber the gaseous oxygen was subjected to electron beams produced by an electron gun. As a result a liquefied ozone was obtained from the chamber at the rate of 5.2ml/min. It was found that 30.9% by weight of the oxygen gas had been converted into ozone.

EXAMPLE (3)

A liquid oxygen was contained at a temperature of −180° C. in the container, and was pumped out to the adsorption tower at the rate of 20ml/min., where it was purged of hydrocarbons. It was then fed to the double pipe exchanger, where the oxygen was warmed to a temperature of −130° C. under the atmospheric pressure as a result of heat exchange with air. In this way the oxygen was gasified, which was sent to the reaction chamber. In the chamber plasmas were impinged upon the gaseous oxygen. As a result a liquefied ozone was obtained from the chamber at the rate of 4.5ml/min. It was found that 26.7% by weight of the oxygen gas had been converted into ozone.

EXAMPLE (4)

A liquid oxygen was contained at a temperature of −180° C. in the container, and was pumped out to the adsorption tower at the rate of 20ml/min., where it was purged of hydrocarbons. It was then sent to the double pipe exchanger, in which the oxygen was warmed to a temperature of −145° C. under the atmospheric pressure as a result of heat exchange with air. In this way the oxygen was gasified, which was sent to the reaction chamber 14. In the chamber 14 a 10K volts discharge current was impressed upon the electrodes 15 in the atmosphere of oxygen. As a result a liquefied ozone was obtained from the chamber at the rate of 5.7ml/min. It was found that 33.9% by weight of the oxygen gas had been converted into ozone.

As is evident from the foregoing description, the process according to the present invention is adapted especially for industrial use, where it is essential that pure liquid ozone should be produced on a large scale efficiently and economically. It has been demonstrated that the ozone produced by the process of the present invention can be utilized in many industrial fields, for example, as a bleaching agent of pulp and textile, a water purification agent, an oxidizing agent, a reaction accelarator, a bacteriocide. As ozone converts into oxygen, no secondary pollution problem will be invited. In view of this feature of ozone ozone should be more utilized, and the present invention can make its utilization easier and more economical.

What is claimed is:

1. 7. A process for the mass production of ozone, comprising warming a liquid oxygen to a temperature not higher than the boiling point of ozone by means of a heat exchanger, thereby obtaining a gasified oxygen; introducing said gasified oxygen to a reaction chamber; impinging ozoning radiations selected from the group consisting of laser beams, and plasma discharges upon said gasified oxygen, hereby generating ozone; and collecting said ozone in its liquid state separated from said gaseous oxygen under said thermal atmosphere having a temperature not higher than the boiling point of ozone and wherein unreacted oxygen is recycled to the heat exchanger for reuse in the process.

2. A process as claimed in claim 1, wherein the ozoning radiations are laser beams.

3. A process as claimed in claim 1, wherein the ozonizing radiations are plasma discharges.

4. A process for the mass production of ozone from oxygen comprising:
   (a) converting liquid oxygen to its gaseous state by warming it to a temperature above its boiling point and below the boiling point of ozone;
   (b) maintaining the gaseous oxygen at a temperature between the boiling point of oxygen and the boiling point of ozone and, while it is so maintained, impinging it with ozonizing radiations selected from the group consisting of laser beams and plasma discharges whereby liquid ozone is directly formed; and
   (c) separating the formed liquid ozone from the gaseous oxygen;
   (d) and wherein unreacted oxygen is recycled to the heat exchanger for reuse in the process.

5. A process as claimed in claim 4, wherein the ozonizing radiations are laser beams.

6. A process as claimed in claim 4, wherein the ozonizing radiations are plasma discharges.

7. The process of claim 4, wherein the temperature is maintained between −183° C. and −112° C.

8. The process of claim 4, wherein the temperature is maintained between −150° C. and −120° C.

* * * * *